(12) United States Patent
Devgan et al.

(10) Patent No.: US 8,224,188 B2
(45) Date of Patent: Jul. 17, 2012

(54) EVEN-ORDER HARMONIC CANCELLATION AND INCREASED RF GAIN USING DUAL-OUTPUT MACH-ZEHNDER MODULATOR WITH TWO WAVELENGTH INPUT

(75) Inventors: Preetpaul S Devgan, Laurel, MD (US); Vincent J Urick, Alexandria, VA (US); Keith J Williams, Dunkirk, MD (US); John F. Diehl, Bowie, MD (US); Christopher E. Sunderman, Rockville, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 408 days.

(21) Appl. No.: 12/688,062

(22) Filed: Jan. 15, 2010

(65) Prior Publication Data

US 2010/0266289 A1 Oct. 21, 2010

Related U.S. Application Data

(60) Provisional application No. 61/171,250, filed on Apr. 21, 2009.

(51) Int. Cl.
*H04B 10/00* (2006.01)
(52) U.S. Cl. ............... 398/159; 398/147; 398/148
(58) Field of Classification Search ........... 398/147–159
See application file for complete search history.

(56) References Cited

U.S. PATENT DOCUMENTS

| 6,246,500 | B1 * | 6/2001 | Ackerman | .................. 398/115 |
| 7,079,780 | B1 * | 7/2006 | Rollins | ...................... 398/198 |
| 2009/0297140 | A1 * | 12/2009 | Heismann et al. | .............. 398/16 |
| 2010/0245968 | A1 * | 9/2010 | Smith et al. | .................... 359/239 |

OTHER PUBLICATIONS

J. E. Roman, et al., "Fiber-optic remoting of an ultrahigh dynamic range radar," IEEE Trans. Microwave Theory Tech. 46, 2317-2323 (1998).
C. Chang, et al., "Fiber optic delay line devices for RF signal processing," Electron. Lett. 13, 678-680 (1977).
S. D. White, "Implementation of a photonic automatic gain control system for correcting gain variations in the Green Bank Telescope fiber optic system," Review of Scientific Instruments, vol. 71, pp. 3196-3199 (2000).
A. L. Campillo, et al., "Phase performance of an eight-channel wavelength-division-multiplexed analog-delay line," IEEE J. Lightw. Technol., vol. 22, pp. 440-447 (2004).

(Continued)

*Primary Examiner* — Dzung Tran
(74) *Attorney, Agent, or Firm* — Amy Ressing; Joslyn Barritt (57) ABSTRACT

A method and system for processing analog optical signals to produce a single RF output free from even-order harmonic distortion. Two analog optical signals of different wavelengths $\lambda 1$, $\lambda 2$ are input into a dual-output Mach-Zehnder modulator (MZM), where one wavelength input is high-biased and one wavelength is low-biased. The complementary high- and low-biased wavelengths are output from each arm of the MZM to a multiplexer, which filters out the unwanted high- or low-biased wavelengths from each MZM arm so that both wavelengths are low-biased or high-biased. The signals are passed to a pair of photodiodes, and the photocurrents from the photodiodes are differenced to produce the final RF output. Because of the complementary phase differences between the two low- or high-biased signals generating the photocurrent, all components of the photocurrent except the fundamental and odd-order harmonics cancel each other, resulting in a high-quality RF output free from harmonic distortion.

12 Claims, 6 Drawing Sheets

OTHER PUBLICATIONS

E. Ackerman, "Broad-band linearization of a Mach-Zehnder electrooptic modulator," IEEE Trans. Microwave Theory Tech. 47, 2271-2279 (1999).

M. J. LaGasse, et al., "Optical carrier filtering for high dynamic range fibre optic links," Electronics Letters, vol. 30, pp. 2157-2158 (1994).

X. B. Xie, et al., "Suppressed-carrier large-dynamic-range heterodyned microwave fiber-optic link," IEEE International Topical Meeting on Microwave Photonics, Ogunquit, ME (2004).

M. L. Farwell, et al., "Increased linear dynamic range by low biasing the Mach-Zehnder modulator," IEEE Photonics Technol. Lett., vol. 5, pp. 779-782 (1993).

A. Karim et al., "Noise Figure Reduction in Externally Modulated Analog Fiber-Optic Links," IEEE Photonics Technol. Lett., vol. 19, pp. 312-314 (2007).

X. J. Meng et al., "Microwave Photonic Link with Carrier Suppression for Increased Dynamic Range," Fiber and Integrated Optics, vol. 25, pp. 161-174 (2006).

M. M. Sisto, et al, "Carrier-to-noise ratio optimization by modulator bias control in radio-over-fiber links," IEEE Photonics Technol. Lett. 18, 1840-1842 (2006).

L. T. Nichols, et al., "Optimizing the ultrawide-band photonic link," IEEE Trans. Microwave Theory Tech. 45, 1384-1389 (1997).

M. T. Abuelma'Atti, "Large signal analysis of the Mach-Zehnder modulator with variable bias," Proc. Natl. Sci, Counc. ROC(A) 25, 254-257 (2001).

M. M. Sisto, et al., "Erbium amplifier dynamics in wireless analog optical links with modulator bias optimization," IEEE Photonics Technol. Lett. 19, 408-410 (2007).

V. J. Urick, et al., "Analysis of an analog fiber-optic link employing a low-biased Mach-Zehnder modulator followed by an Erbium-doped fiber amplifier," IEEE J. Lightwave Technol. 27, 2013-2019 (2009).

W. K. Burns, et al. "Multi-octave operation of low-biased modulators by balanced detection," IEEE Photonics Technol. Lett. 8, 130-132 (1996).

* cited by examiner

EVEN-ORDER HARMONIC CANCELLATION AND INCREASED RF GAIN USING DUAL-OUTPUT MACH-ZEHNDER MODULATOR WITH TWO WAVELENGTH INPUT

CROSS-REFERENCE

This application claims the benefit of priority based on U.S. Provisional Patent Application No. 61/171,250 filed on Apr. 21, 2009, the entirety of which is hereby incorporated by reference into the present application.

TECHNICAL FIELD

The present invention relates to RF signal processing in analog optical fiber links, particularly improvement in RF performance of long haul analog fiber optic links.

BACKGROUND

Analog fiber optic links have become an important tool in modern communications. Such fiber optic links are used in numerous communications applications such as antenna-remoting, delay lines, signal-processing, and radio-over-fiber applications, just to name a few. See J. E. Roman, et al., "Fiber-optic remoting of an ultrahigh dynamic range radar," IEEE Trans. Microwave Theory Tech. 46, 2317-2323 (1998); C. Chang, et al., "Fiber optic delay line devices for RF signal processing," Electron. Lett. 13, 678-680 (1977); S. D. White, "Implementation of a photonic automatic gain control system for correcting gain variations in the Green Bank Telescope fiber optic system," Review of Scientific Instruments, vol. 71, pp. 3196-3199 (2000); A. L. Campillo, et al., "Phase performance of an eight-channel wavelength-division-multiplexed analog-delay line," IEEE J. Lightw. Technol., vol. 22, pp. 440-447 (2004); and E. E. Funk, et al., "High dynamic range, long haul (>100 km) radio over fiber," in Microwave Photonics, Boca Raton: CRC Press, 2007, ch. 6, pp. 185-212.

Many of these links use Mach-Zehnder intensity modulators (MZM) to impose an RF signal on a single optical carrier. The RF optical signal modulated by the MZM is then amplified and passed down the optical fiber link, where it is recovered by direct detection at a photodiode. The MZM is quadrature-biased and its use adds no even-order distortion to the RF signal.

Various suppressed carrier techniques have been demonstrated to improve the performance of these analog optical fiber links, including filtering of the input optical signal, using a null-biased Mach-Zehnder modulator with a local oscillator, and using a low-biased Mach-Zehnder modulator. See M. J. LaGasse, et al., "Optical carrier filtering for high dynamic range fibre optic links," Electronics Letters, vol. 30, pp. 2157-2158 (1994); X. B. Xie, et al., "Suppressed-carrier large-dynamic-range heterodyned microwave fiber-optic link," IEEE International Topical Meeting on Microwave Photonics, Ogunquit, Me. (2004); M. L. Farwell, et al., "Increased linear dynamic range by low biasing the Mach-Zehnder modulator," IEEE Photonics Technol. Lett., vol. 5, pp. 779-782 (1993); A. Karim et al., "Noise Figure Reduction in Externally Modulated Analog Fiber-Optic Links," IEEE Photonics Technol. Lett., vol. 19, pp. 312-314 (2007); and X. J. Meng et al., "Microwave Photonic Link with Carrier Suppression for Increased Dynamic Range," Fiber and Integrated Optics, vol. 25, pp. 161-174 (2006).

In addition, analog metrics such as RF noise figure, spur free dynamic range (SFDR) and compression dynamic range (CDR) improve with increased photocurrent, and so amplification of the signal often is desirable to maximize the optical power reaching the photodiode. Unfortunately, the nonlinear Stimulated Brillouin Scattering (SBS) effect limits the amount of optical power that can enter the fiber. One method to increase the SBS threshold is to suppress the optical carrier by low-biasing the MZM. See M. M. Sisto, et al, "Carrier-to-noise ratio optimization by modulator bias control in radio-over-fiber links," IEEE Photonics Technol. Lett. 18, 1840-1842 (2006); L. T. Nichols, et al., "Optimizing the ultrawide-band photonic link," IEEE Trans. Microwave Theory Tech. 45, 1384-1389 (1997); M. T. Abuelma' Atti, "Large signal analysis of the Mach-Zehnder modulator with variable bias," Proc. Natl. Sci. Counc. ROC(A) 25, 254-258 (2001). The use of a high power laser with a low-biased MZM has been shown not only to improve the SBS threshold, but also to improve the RF noise figure of an analog link. See A. Karim et al., supra.

However, the previous works have not considered the benefits of post-modulator amplification for low-biased MZM links. Recent work has shown that a low-biased MZM followed by optical amplification increases the RF gain of an analog link beyond simply increasing the optical power at the photodiode. M. M. Sisto, et al., "Erbium amplifier dynamics in wireless analog optical links with modulator bias optimization," IEEE Photonics Technol. Lett. 19, 408-410 (2007); V. J. Urick, et al., "Analysis of an analog fiber-optic link employing a low-biased Mach-Zehnder modulator followed by an Erbium-doped fiber amplifier," IEEE J. Lightwave Technol. 27, 2013-2019 (2009). However, although the various low-biased MZM techniques have been shown to improve the RF performance of fiber-optic analog links, they have a serious disadvantage when compared to quadrature-biased MZM links because the even-order harmonics become quite large, and thus the use of low-biased MZMs is limited to single-octave applications.

One approach to solving this problem cancels the even-order harmonics by low-biasing two wavelengths on either side of the null of the bias curve with a single output MZM. See U.S. Pat. No. 7,079,780, to Rollins, "Linearized optical link using a single Mach-Zehnder modulator and two optical carriers." However this method does not demonstrate an improvement in the RF metrics from low-biasing the wavelengths.

Another technique uses two separate MZMs in order to cancel the unwanted harmonics. W. K. Burns, et al. "Multi-octave operation of low-biased modulators by balanced detection," IEEE Photonics Technol. Lett. 8, 130-132 (1996). However, this method requires the RF signal be split to two MZMs, which results in higher loss for the RF signal.

Another method inputs two optical carriers at different wavelengths through a single MZM. The use of two optical carriers has been shown to linearize unwanted harmonics in a fiber link. E. Ackerman, "Broad-band linearization of a Mach-Zehnder electrooptic modulator," IEEE Trans. Microwave Theory Tech. 47, 2271-2279 (1999). Unfortunately, the linearization process reduces the RF power of the fundamental while reducing the harmonic, and requires over 200 nm of separation in the wavelengths of the two optical carriers, and thus this method has limited usefulness and is not suitable for many applications.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a system and method for producing an RF signal from an analog optical signal wherein the even-order harmonics are cancelled while the remaining RF signal metrics are improved.

In accordance with the present invention, two analog optical signals of different wavelengths λ1, λ2 are input into a dual-output Mach-Zehnder modulator (MZM). An appropriate DC bias voltage is applied at the MZM, which causes the modulator to high-bias one input wavelength and simultaneously low-bias the other input wavelength. The two wavelengths λ1, λ2 are passed through each output of the dual-output MZM, with λ1 being high-biased and λ2 being low-biased at one output, and λ2 being high-biased and λ1 being low-biased at the other. The signals output from the MZM are then passed through a wavelength division multiplexer, which in some embodiments filters out the high-biased signals and outputs only the low-biased ones, and in other embodiments filters out the low-biased signals and outputs only the high-biased ones. The filtered signals are passed to a wavelength demultiplexer for separation, either via an intermediate optical amplifier in some embodiments or directly from the multiplexer in others. The separated wavelengths are then each passed to a photodiode. The photocurrents from the two photodiodes are differenced, and as a result, the second-order harmonics cancel out while the fundamental and odd-order harmonics add to produce the final RF output. Since the fundamentals increase, this technique does not degrade the fundamental RF power as is often the case in linearization techniques. In addition, if low-biased wavelengths are used, the RF power can be increased, not only over that produced by using high-biased wavelengths but over that produced by using only one wavelength.

DETAILED DESCRIPTION

The invention summarized above can be embodied in various forms. The following description shows, by way of illustration, combinations and configurations in which the aspects can be practiced. It is understood that the described aspects and/or embodiments of the invention are merely examples. It is also understood that one skilled in the art may utilize other aspects and/or embodiments or make structural and functional modifications without departing from the scope of the present disclosure.

For example, although the technique of the present invention is described herein in the context of an exemplary embodiment having a specific set of wavelengths and voltages and a particular arrangement of electronic components, it would be readily apparent to one skilled in the art that the described embodiment reflects only one of many in which the technique of the present invention can be used.

A Mach Zehnder modulator (MZM) uses the electro-optic effect inherent in the material from which it is made to add an optical phase modulation to an input optical signal such as a continuous wave laser input, with the phase modulation being a function of a voltage applied in the MZM. The MZM interferometric architecture converts the phase modulation into intensity modulation at the output coupler. In a dual-output MZM, the DC bias applied controls how much power comes out one arm of the MZM as compared to the other.

In accordance with the present invention, two analog optical signals of different wavelengths λ1, λ2 are input into a dual-output Mach-Zehnder modulator (MZM). An appropriate DC bias voltage is applied at the MZM, which causes the modulator to high-bias one input wavelength and simultaneously low-bias the other input wavelength. The two wavelengths λ1, λ2 are passed through each output of the dual-output MZM, with λ1 being high-biased and λ2 being low-biased at one output, and λ2 being high-biased and λ1 being low-biased at the other. The signals output from the MZM are then passed through a wavelength division multiplexer, which in some embodiments filters out the high-biased signals and outputs only the low-biased ones, and in other embodiments filters out the low-biased signals and outputs only the high-biased ones. The filtered signals are passed to a wavelength demultiplexer for separation, either via an intermediate optical amplifier in some embodiments or directly from the multiplexer in others. The separated wavelengths are then each passed to a photodiode. The photocurrents from the two photodiodes are differenced, and as a result, the second-order harmonics cancel out while the fundamental and odd-order harmonics add to produce the final RF output. Since the fundamentals increase, this technique does not degrade the fundamental RF power as is often the case in linearization techniques. In addition, if low-biased wavelengths are used, the RF power can be increased, not only over that produced by using high-biased wavelengths but over that produced by using only one wavelength.

Figure 1A:
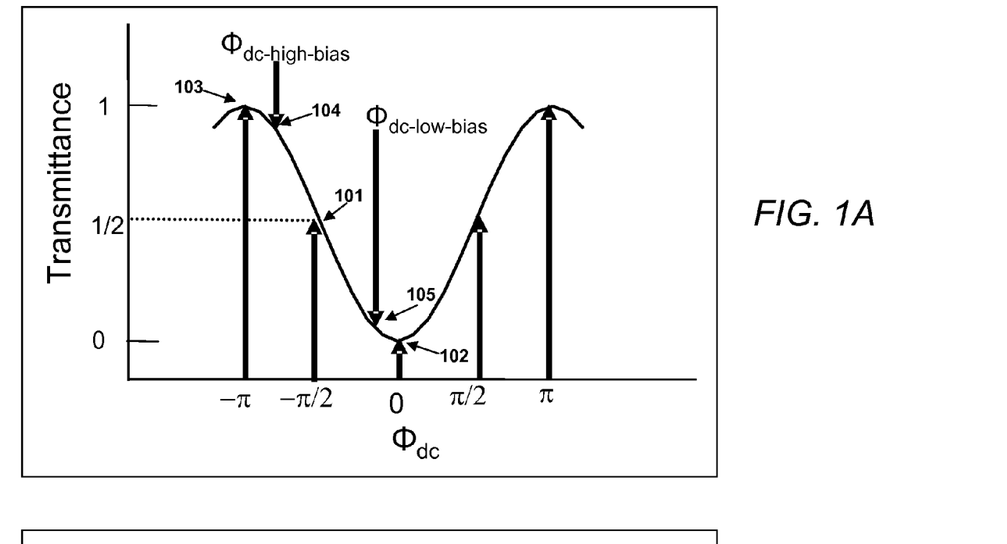
FIGS. 1A and 1B depict plots of the transmittance of a single wavelength through an ideal single-output (FIG. 1A) and a dual-output (FIG. 1B) Mach-Zehnder modulator as a function of DC bias phase shift $\phi_{dc}$.

As shown in FIG. 1A, an ideal MZM has a sinusoidal output power transfer curve as a function of DC phase shift $\phi_{dc}$. The output power ranges from a minimum transmittance, denoted as 0 in the plot shown in FIG. 1A, to a maximum transmittance, denoted as a transmittance of 1. There are a few operating points along the transfer curve that are worth noting. The first is the quadrature-bias point 101, which is at a DC phase shift of π/2 or −π/2 and lies at the point where the output power is half the maximum output power, e.g., where the transmittance equals ½ in FIG. 1A. The null-bias point 102 is the one at which the DC phase shift is 0 and the output power is 0. The max-bias point 103 is the one at which the DC phase shift is π or −π and the output power is maximum. The high-bias point 104, $\phi_{dc\text{-}high\text{-}bias}$, is slightly lower than the max-bias point, as shown in FIG. 1A, while the low-bias point 105, $\phi_{dc\text{-}low\text{-}bias}$, is slightly higher than the null-bias point.

Figure 1B:
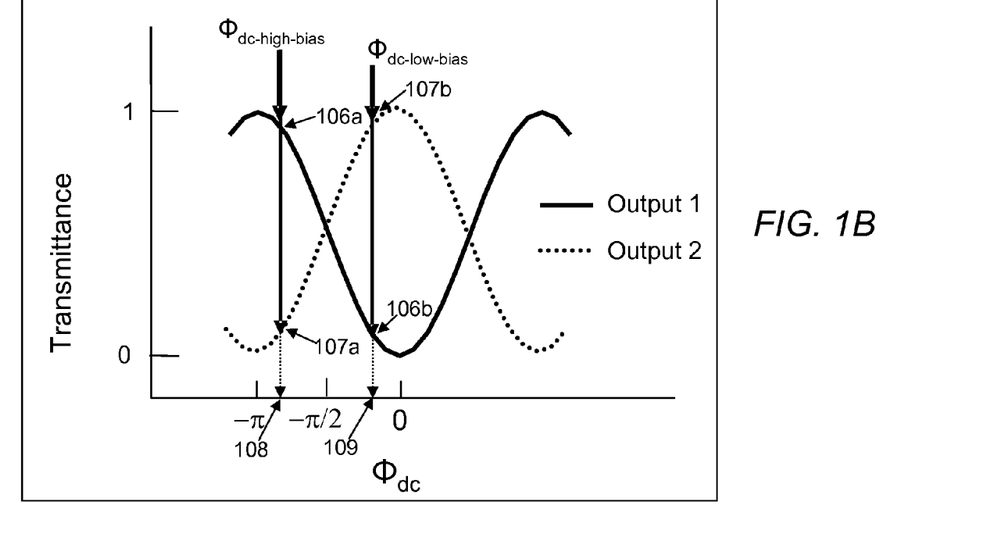

The transfer function shown in FIG. 1A is for one output of the MZM. As shown in FIG. 1B, in a two-output MZM, the transfer function of the second output of the MZM has a complementary relation to the first output as a function of DC phase shift $\phi_{dc}$. Thus, as shown in FIG. 1B, at DC phase shift $\phi_{dc}$ 108, the high-bias point 106a of Output 1 will be at the low-bias point 107a of Output 2, while at DC phase shift $\phi_{dc}$ 109, the low-bias point 106b of Output 1 is at the high-bias point 107b of Output 2.

Figure 2:
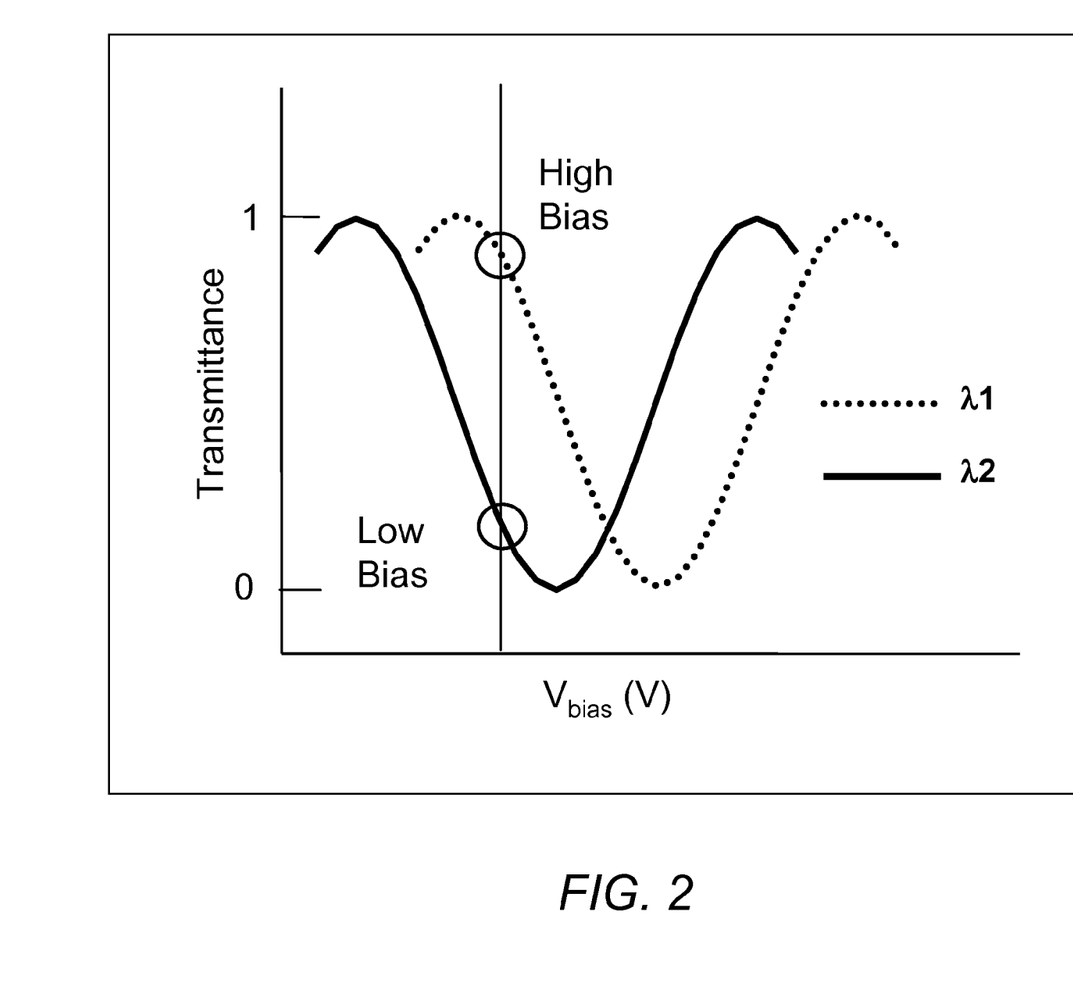
FIG. 2 depicts a plot of the transmittance of two wavelengths through a wavelength-sensitive Mach-Zehnder modulator as a function of bias voltage $V_{bias}$.

As described in more detail below, the present invention exploits this dual-output symmetry by inputting two wavelengths into the MZM and inducing an appropriate phase shift to achieve simultaneous high-bias and low-bias output from each output. As shown in FIG. 2, the simultaneous high-biasing of one wavelength and low-biasing of another wavelength can be achieved by applying an appropriate DC bias voltage, based on the wavelengths of the input signals and their wavelength separation, in the MZM. Due to the wavelength dependence of the material in the MZM, the phase shift will be different for one wavelength as compared to another wavelength. This effect is exaggerated if the arms of the MZM are not perfectly matched without any applied DC voltage, and can be shown as a shift in the transfer curve for a given DC bias voltage. The correct bias and wavelength separation are dependent on the material in the MZM and how unbalanced the MZM arms are, and can be experimentally determined for each MZM.

If λ1 and λ2 are appropriately chosen, the application of the DC bias voltage $V_{bias}$ of the MZM can generate the appropriate phase shifts so that λ1 is high-biased while λ2 is low-biased, as shown in FIG. 2. For example, if λ1 is high-biased and λ2 is low-biased at one output of a dual-output MZM, due to the complementary relation of the second MZM output to the first output described above, at the other output, λ2 will be high-biased while λ1 is low-biased. In accordance with the present invention and as described in more detail below, by wavelength multiplexing the output of the dual-output MZM to filter out the low-biased output from one arm of the MZM and the complementary low-biased output from the other arm, two low-biased carrier wavelengths can be produced, where the RF signal and all of the odd-order harmonics on one wavelength are out-of-phase with respect to the RF signal on the other wavelength. Each wavelength is then sent to its own individual photodetector and the resulting photocurrent is subtracted. Because the RF signal and the odd-order harmonics are out-of-phase, the will add when the photocurrents are subtracted to produce the final signal. However, because the even-order RF harmonics of both wavelengths are in-phase, when they are subtracted, they will be cancelled and will not be present in the final signal.

In accordance with the present invention, the two wavelengths λ1, λ2 to be input into the dual-output MZM can be selected so that $$\phi_{dc,\lambda 2} = -\pi - \phi_{dc,\lambda 1}$$

where $\phi_{dc,\lambda 1}$ is the DC phase shift for a high-biased λ1 and $\phi_{dc,\lambda 2}$ is the DC phase shift for a high-biased λ2. $\phi_{dc}$ is directly proportional to $V_{bias}$ by the relation $$\varphi_{dc} = \frac{\pi V_{bias}}{V_{\pi,dc}},$$

where $V_\pi$ is a measure of the conversion efficiency of the MZM modulator. In essence, the relation between $\phi_{dc}$ and $V_{bias}$ indicates how much optical phase shift occurs as the voltage varies. If λ1 and λ2 are appropriately chosen, the relation in phase shift between λ1 and λ2 will result in λ1 being high-biased while λ2 is low-biased at one output of the MZM, and λ2 being high-biased while λ1 is low biased at the other, and as described below, will result in both wavelengths being high-biased or low-biased when they reach the photodetector.

In some embodiments, λ1 and λ2 can be selected by having one input, e.g., a continuous wave laser, set to operate at a fixed wavelength λ1 and the correct $V_{bias}$ set in order to either high or low-bias The wavelength λ2 of the second input can then be tuned in order to satisfy the relationship between $\phi_{dc,\lambda 1}$ and $\phi_{dc,\lambda 2}$ described above. Of course, any other appropriate methods of setting λ1 and λ2 can be used, so long as the relationship between $\phi_{dc,\lambda 2}$ and $\phi_{dc,\lambda 2}$ described above is met. Note that there will always need to be some separation between λ1 and λ2 in order for the phase shift relation to hold true. The amount of required separation is a function of the parameters of the specific MZM, and can be a few nanometers or as much as 100 nm, depending on the MZM used. In addition, as will readily be appreciated, due to the periodicity of λ1 and λ2, not only can λ1 and λ2 be used, but so can λ1 and nλ2 where nλ2 can be any multiple of λ2.

Figure 3:
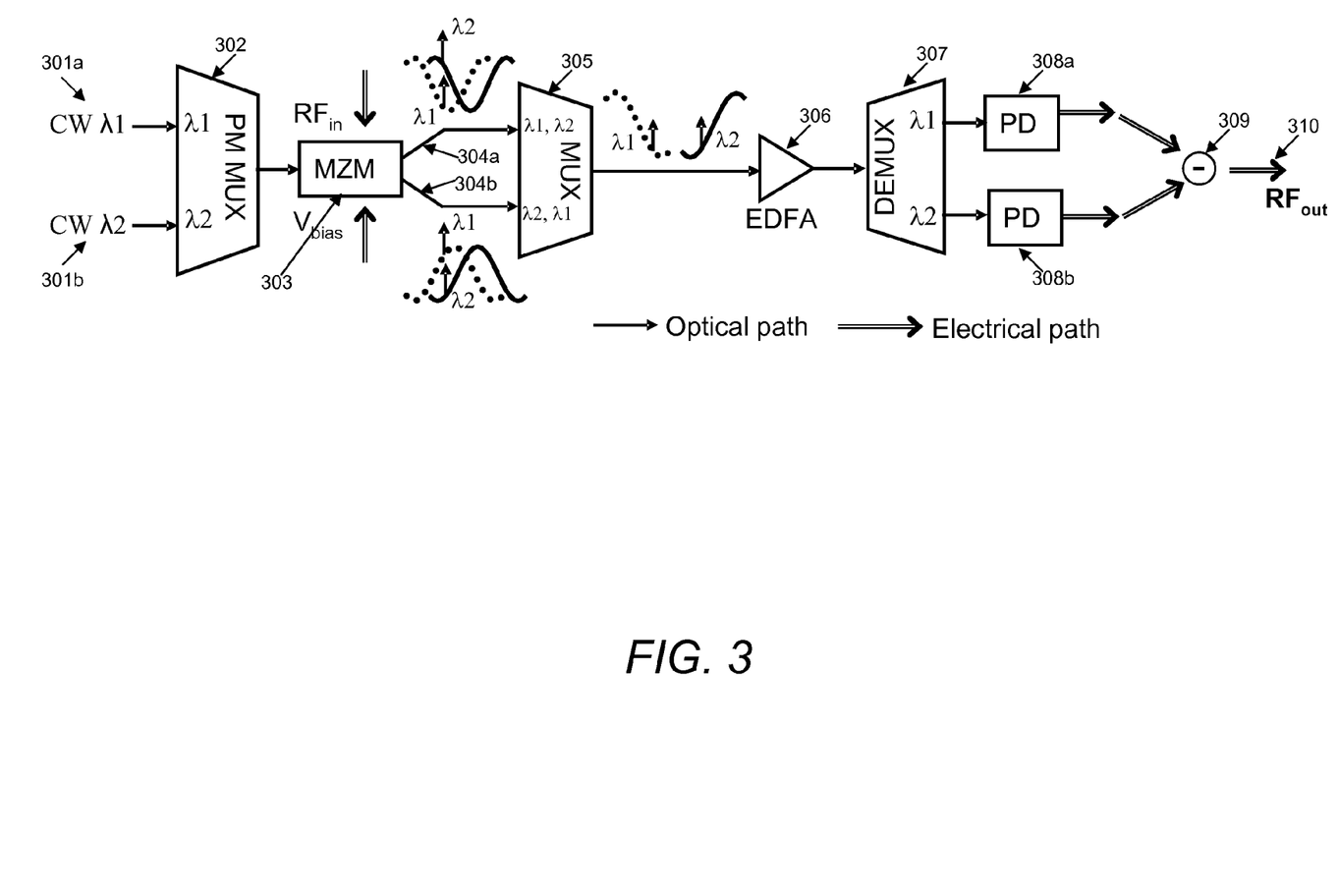
FIG. 3 depicts an exemplary architecture for even-order harmonic cancellation employing a dual-output Mach-Zehnder modulator with two wavelength inputs in accordance with the present invention.

FIG. 3 depicts an exemplary architecture for an optically amplified analog link employing a dual-output Mach-Zehnder modulator for use in the method of the present invention. As shown in FIG. 3, two analog optical inputs having two different wavelengths λ1, λ2, for example CW lasers 301a, 301b, can provide input signals to PM MUX 302. PM MUX 302 outputs λ1 and λ2 to MZM 303, which, for a properly chosen $V_{bias}$ outputs a low-biased λ1 and a high-biased λ2 at one output arm 304a and simultaneously outputs a low-biased λ2 and a high-biased λ2 at the other output arm 304b. The output from each output arm 304a, 304b of MZM 303 can be input into MUX 305, which can filter out the high-biased components from each input and output a multiplexed signal made up of only the low-biased λ2. The low-biased signal from the MUX can then be fed into an amplifier such as EDFA 306, which can amplify the signal and send them to DEMUX 307, which can separate the multiplexed signal back into two signals λ1, λ2. The two signals λ1, λ2 are each fed into a corresponding photodetector PD1 308a and PD2 308b which generate corresponding photocurrents $I_{PD1}$ and $I_{PD2}$. The photocurrents are then differenced at element 309, which can comprise a differencing element in a balanced photodetector or a differencing element in a hybrid photodetector, and the resulting differenced signal is output as $RF_{out}$ 310.

The photocurrents produced by PD1 (i.e., from λ1) and PD2 (i.e., from λ2) can be expressed mathematically as follows:

$$I_{PD1}(\varphi_{dc,\lambda_1}, t) = \frac{1}{2} G_o \zeta (1 - \cos(\varphi_{dc,\lambda_1}) J_0(\varphi_{rf})) + \quad (1)$$

$$G_o \zeta \sin(\varphi_{dc,\lambda_1}) \sum_{n=0}^{\infty} J_{2n+1}(\varphi_{rf}) \sin((2n+1)\Omega t) -$$

$$G_o \zeta \cos(\varphi_{dc,\lambda_1}) \sum_{n=1}^{\infty} J_{2n}(\varphi_{rf}) \cos(2n\Omega t)$$

$$I_{PD2}(\varphi_{dc,\lambda_2}, t) = \frac{1}{2} G_o \zeta (1 + \cos(\varphi_{dc,\lambda_2}) J_0(\varphi_{rf})) - \quad (2)$$

$$G_o \zeta \sin(\varphi_{dc,\lambda_2}) \sum_{n=0}^{\infty} J_{2n+1}(\varphi_{rf}) \sin((2n+1)\Omega t) +$$

$$G_o \zeta \cos(\varphi_{dc,\lambda_2}) \sum_{n=1}^{\infty} J_{2n}(\varphi_{rf}) \cos(2n\Omega t)$$

where $G_o$ is the net optical gain from the MZM output to the photodiode; $\zeta = \Re \alpha_{fiber} \alpha_{mzm} P_{o,in}$, where $\Re$ is the photodiode responsivity, $\alpha_{fiber}$ is the optical power loss for the fiber between the output of the MZM and the photodiode, $\alpha_{mzm}$ is the optical power loss for the MZM, and $P_{o,in}$ is the optical input power into the MZM; $J_m$ is an $m^{th}$-order Bessel function of the first kind; $\phi_{rf}$ is the phase shift induced by the driving oscillation at angular frequency $\Omega$; t denotes time; and $\phi_{dc}$ is the phase shift induced by the DC bias voltage on $\lambda_1$ and $\lambda_2$, respectively. Note that $G_o$ and $\zeta$ are the same for both photocurrents, and thus the net optical gain, the photodiode responsivity, the optical power loss in the MZM and the fiber, and the optical input power are the same for both wavelengths, which is reasonable assuming the wavelengths are separated, e.g., by 10 nm. The photodiode responsivity and power loss in the MZM and fiber are wavelength independent up to about a 50 nm separation typically. If the wavelength separation is greater than that, the uneven loss can be compensated by either turning down the power out of one of the lasers or by adding more loss in front of one of the photo detectors.

In Eq. (1) and Eq. (2), each line represents a different component to the overall photocurrent output by PD1 and PD2, respectively. Specifically, line 1 is the expression for the DC photocurrent, line 2 represents the components due to the odd-order harmonics, which include the fundamental, and line 3 represents the components due to the even-order harmonics.

As described above, $\lambda 1$ and $\lambda 2$ can be any combination of wavelengths so long as the DC phase shift relation noted above is met $$\phi_{dc,\lambda_2} = -\pi - \phi_{dc,\lambda_1}. \tag{3}$$

When the value of $\phi_{dc,\lambda_2}$ from Eq. (3) is substituted into Eq. (2) and Eq. (2) is subtracted from Eq. (1), the DC and even-order harmonics are cancelled while the fundamental and odd-order harmonics add. As a result, the following final RF signal $RF_{out}$ is produced:

$$RF_{OUT} = I_{PD1} - I_{PD2} \tag{4}$$
$$= 2G_o \zeta \sin(\varphi_{dc,\lambda_1}) \sum_{n=0}^{\infty} J_{2n+1}(\varphi_{rf}) \sin((2n+1)\Omega t).$$

Thus, by using a two wavelength input at a dual-output MZM, the system and method of the present invention can produce a final RF signal free from the second-order harmonics that can create spurious signals at the output which can degrade the spur free dynamic range and thus limit the operation of the analog optical link to single-octave applications. In addition, because the fundamentals increase, the fundamental RF power is not degraded as is the case in conventional linearization techniques.

Moreover, as described below, in accordance with some aspects of the present invention, if two wavelength inputs which are both low-biased by a dual-output MZM are used, the RF power of the final signal can be improved over the RF power of a signal produced by using only one low-biased wavelength. In such embodiments, the wavelengths output from the MZM are filtered by the multiplexer to remove the high-biased output so that only the low-biased wavelengths are fed into the photodiode by way of the amplifier.

The general expression for the RF power of a single wavelength as a function of DC bias phase shift is given by the equation $$P_{rf,fund}(\varphi_{dc}) = \frac{1}{2} I_{fund}^2 Z_{out} \tag{5}$$
$$= \frac{1}{2}(G_o \zeta)^2 \sin^2(\varphi_{dc}) J_1^2(\varphi_{rf}) Z_{out},$$

where $Z_{out}$ is the output impedance.

The optical gain $G_o$ due to an amplifier such as EDFA 306 shown in FIG. 3 can be expressed as $$G_o = \frac{G_{o,ss}}{1 + \frac{G_{o,ss} P_{mzm}}{2 P_{o,max}}}, \tag{6}$$

where $G_{o,ss}$ is the small-signal optical gain of the amplifier, $P_{mzm}$ is the output power of the MZM, and $P_{o,max}$ is the maximum optical output power of the amplifier.

In the two-wavelength case, two wavelengths $\lambda 1, \lambda 2$ can be input into the EDFA, for example, from MZM 303 via MUX 305. As noted above, the losses and input power are the same for both wavelength inputs into the MZM, and thus the optical gain for two wavelengths can be written as $$G_{o,two\ wavelength} = \frac{G_{o,ss}}{1 + \frac{G_{o,ss} P_{mzm}}{P_{o,max}}}. \tag{7}$$

Thus, in this case twice the optical power is emitted from the MZM due to the presence of two input wavelengths as compared to the one-wavelength case. Since the optical power after the EDFA is then split equally to each of the photodiodes, the difference in photocurrents can be written as $$I_{fund} = I_{PD1,fund} - I_{PD2,fund} \tag{8}$$
$$= G_{o,two\ wavelength} \zeta \sin(\varphi_{dc,\lambda_1}) J_1(\varphi_{rf}),$$

where the phase relationship between $\lambda_1$ and $\lambda_2$ is included.

Substituting $I_{fund}$ from Eq. (8) into Eq. (5) yields the following RF output power $$P_{rf,fund,two\ wavelength}(\varphi_{dc}) = \frac{1}{2} I_{fund}^2 Z_{out} \tag{9}$$
$$\frac{1}{2}[(G_{o,two\ wavelength} \zeta)^2$$
$$\sin^2(\varphi_{dc,\lambda_1}) J_1^2(\varphi_{rf})] Z_{out}.$$

The only difference between the two-wavelength case of Eq. (9) and the single-wavelength case of Eq. (5) is the optical gain term $G_{o,two\ wavelength}$, as opposed to the optical gain term $G_o$ obtained for a single wavelength input.

However, there is no simple comparison between the two optical gain terms. The RF gain $G_{rf}(\phi_{dc})$ for both the single- and two-wavelength case can be expressed as a function of DC bias phase shift $$G_{rf}(\varphi_{dc}) = \frac{(G_o \zeta \pi)^2 \sin^2(\varphi_{dc}) Z_{in} Z_{out}}{4 V_{\pi,rf}^2}, \qquad (10)$$

where $V_{pi,rf}$ is the measure of the conversion efficiency of the MZM for an RF signal as compared to the conversion efficiency of the MZM for a DC voltage $V_{pi,dc}$, and $Z_{in}$ and $Z_{out}$ are input and output impedance of the link, e.g., $Z_{in}$ would be the input impedance of the MZM and $Z_{out}$ would be the output impedance of the photodiodes, $G_o$ is the optical gain for one or two wavelengths as described above, and the small-signal approximation ($\phi_{rf} \ll 1$) is taken.

Figure 4:
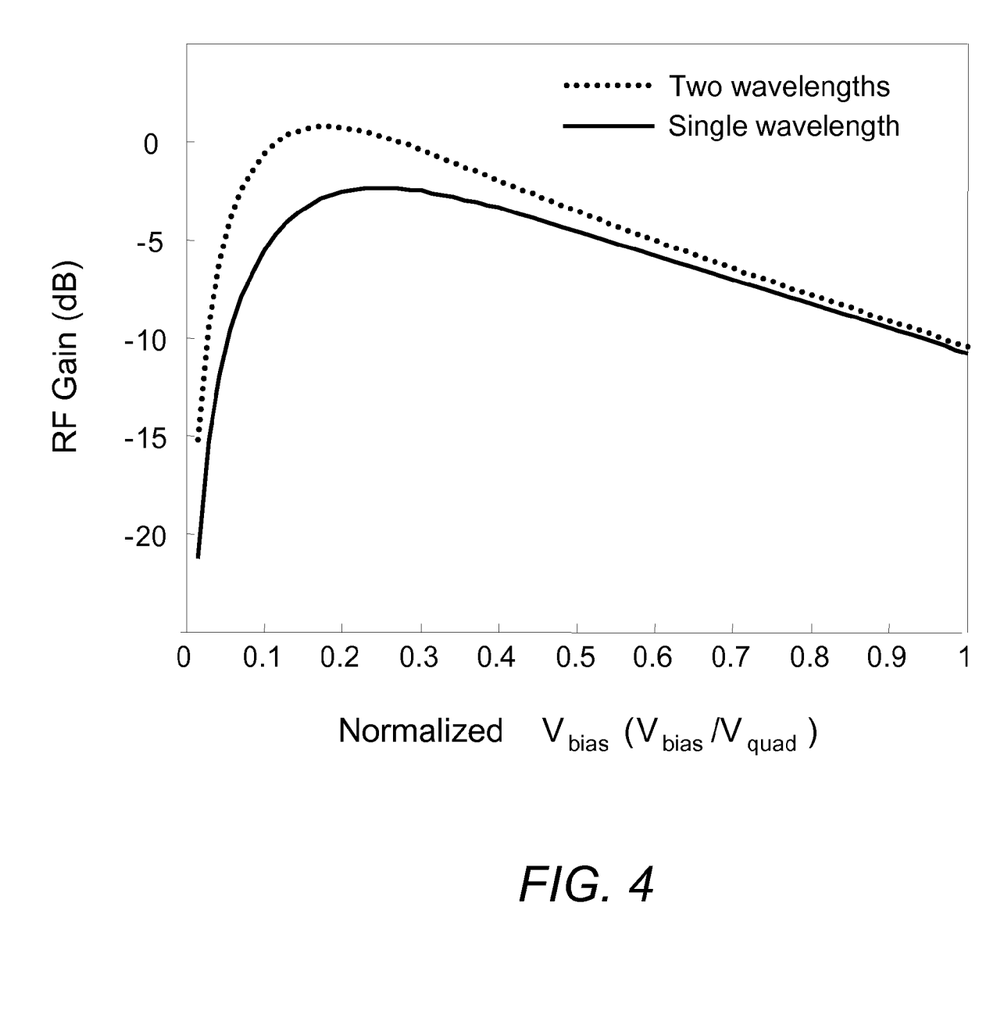
FIG. 4 depicts a plot of RF signal gain as a function of normalized DC bias voltage for a single-wavelength input to a Mach-Zehnder modulator and for a two-wavelength input in accordance with the present invention.

FIG. 4 depicts a plot of the RF gain for the one- and two-wavelength cases. FIG. 4 shows the RF gain as a function of bias voltage normalized to quadrature bias. When the normalized $V_{bias}$ is 1, the modulator is at quadrature. As the normalized $V_{bias}$ reduces from 1, the modulator becomes low-biased. There is a range of bias voltages where the RF gain increases until it quickly rolls-off, and as seen in FIG. 4, the maximum RF gain occurs at a point different in the two-wavelength case than in the single wavelength case.

From FIG. 4, a couple of interesting points can be observed. First, the maximum RF gain occurs at a different DC bias phase shift for a single wavelength than for the two wavelength case. Second, the RF gain does not increase by 3 dB over the entire phase shift region, but in fact varies from 0.33 dB to 3 dB. The RF gain improvement is thus not simply described and may depend on where the initial RF gain was optimized.

Figure 5:
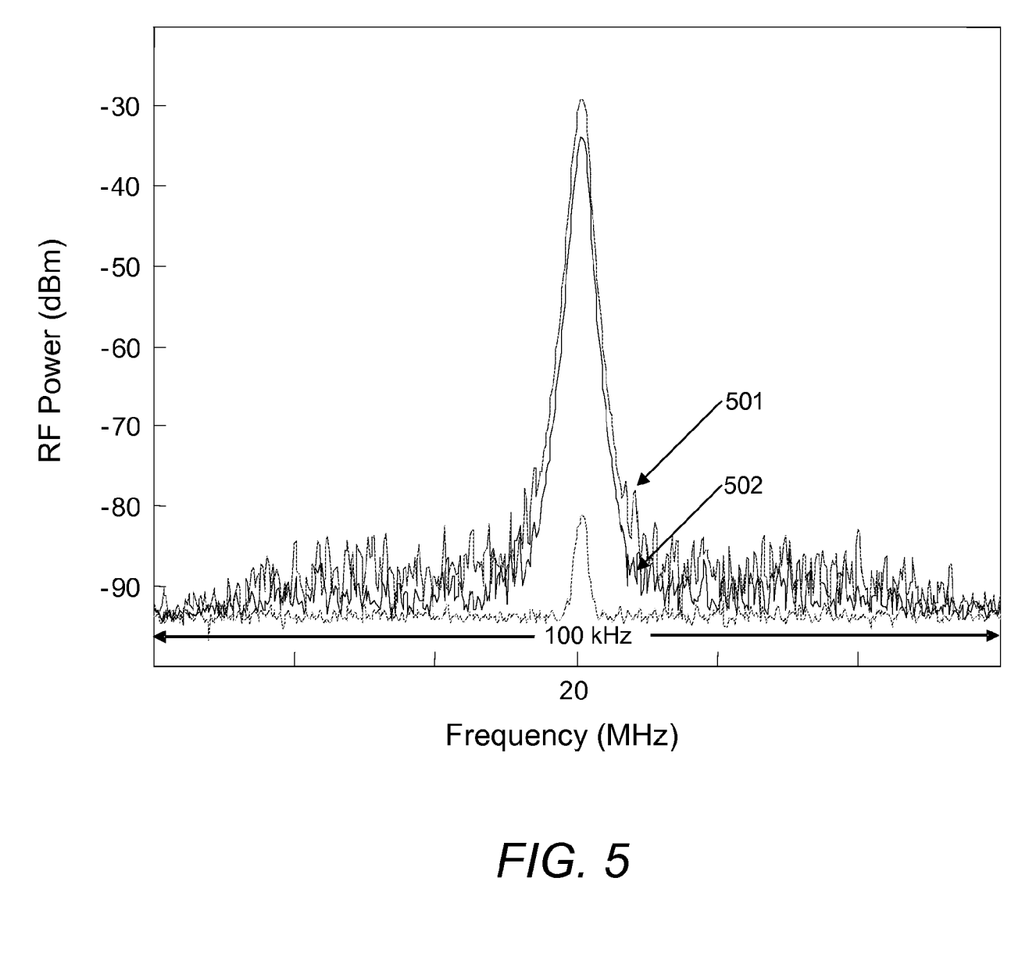
FIG. 5 is a plot showing the RF power of the second-order harmonics when only one wavelength is input into the Mach-Zehnder modulator and when two wavelengths are input in accordance with the present invention.
Figure 6:
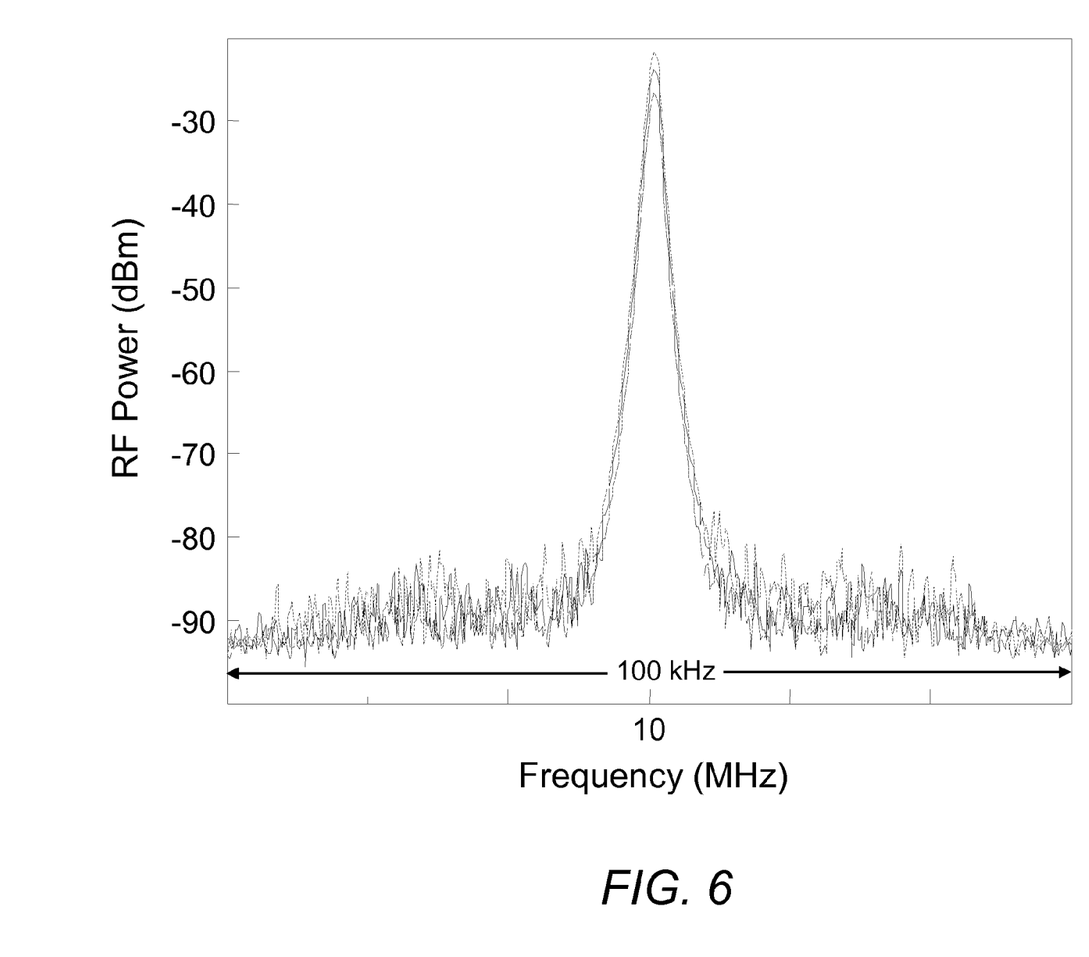
FIG. 6 is a plot showing the RF power of each individual wavelength and the RF power of the combination of two wavelengths in accordance with the present invention.

These results are verified experimentally. FIG. 5 shows the cancellation of the second-order harmonic. The curves 501, 502 are the RF power of the second-order harmonics when only one wavelength input is on. When both wavelength inputs are on, the second-order harmonic is cancelled by up to 45 dB. These results demonstrate that the even-order cancellation is occurring. In addition the fundamental RF power is measured at the point that the even-order cancellation is strongest. FIG. 6 shows the RF power increase achieved by the two-wavelength method of the present invention compared to conventional methods which use only one wavelength. The RF power is only 2 dB higher than the higher single wavelength case, which is within the range of increased RF power predicted in FIG. 4.

Thus, this embodiment of the present invention which uses two low-biased input wavelengths improves on conventional techniques in that the demonstrated RF power of the fundamental frequency is higher than in the case of a single wavelength.

In other embodiments where improved RF gain may not be necessary, the outputs of the MZM can be filtered in order to select the high-biased wavelengths. In such embodiments, with reference to the exemplary architecture shown in FIG. 3, the high-biased wavelengths can be passed directly from MUX 305 to DEMUX 307 and photodiode 308a, 308b, without going through amplifier 306, and the even-order harmonics will cancel in the same manner as described above. Thus, the technique of the present invention can easily be adapted to the needs of the user without loss of the central advantage, i.e., cancellation of the even-order harmonics.

Thus, in accordance with the method of the present invention, a dual-output Mach-Zehnder modulator with two wavelength inputs can be used, where one wavelength operates at high bias and the other operates at low bias at each output arm, and results in the generation of a final RF signal in which even-order harmonics are cancelled while RF power at the fundamental frequency is increased. This technique allows for the use of analog links with improved RF performance typical of low-biased Mach-Zehnder modulators without the limitation of large even-order harmonic distortion. Typical analog links using low-biased Mach-Zehnder modulators are limited to single-octave operation due to the large even-order harmonics.

In addition, the wavelength separation needed to cancel the even-order harmonics is smaller than the wavelength separation needed in other techniques, making the method of the present invention more flexible and useful in more cases. The smaller wavelength separation in this technique allows the system to work at higher RF frequencies while keeping the wavelength separation within the gain bandwidth of the optical amplifier. Another advantage is the smaller the wavelength separation, the longer the analog link can be before dispersion will degrade the performance. Although the necessary wavelength separation to maintain the even-order cancellation increases as the RF frequency goes up, this can be addressed by using a different MZM which is more appropriate for the RF frequencies used and does not affect the method of the invention.

Moreover, by using a dual-output Mach-Zehnder modulator with two wavelength inputs, one operating at high bias and the other operating at low-bias the method of the present invention suppresses the optical carrier and results in a large fraction of the total optical power in the modulation sidebands. This allows for mitigating the fiber nonlinearities as compared to having all the total optical power at one optical frequency. This in turn allows for a higher optical power to be transmitted down the analog link without incurring penalties due to nonlinearities.

It should be readily appreciated that modifications may be made by persons skilled in the art. The present application contemplates any and all modifications within the spirit and scope of the underlying invention described and claimed herein, and all such combinations and embodiments are within the scope of the present disclosure.

What is claimed is:

1. A method for producing an output RF signal free from second-order harmonic distortion in an analog optical fiber link, comprising:

receiving, at a dual-output Mach-Zehnder modulator, a first analog optical signal having a first wavelength λ1 and a second analog optical signal having a second wavelength λ2;

applying, at the Mach-Zehnder modulator, an input RF signal and a bias voltage to the first and second analog optical signals, wherein λ1 is high-biased and λ2 is simultaneously low-biased at a first output arm of the Mach-Zehnder modulator, and λ1 is low-biased and λ2 is simultaneously high-biased at a second output arm of the Mach-Zehnder modulator, receiving, at a multiplexer operatively connected to the Mach-Zehnder modulator, the output from the first and second output arms of the Mach-Zehnder modulator;

filtering, at the multiplexer, the output from the first and second output arms and outputting, from the multiplexer, a multiplexed signal consisting of biased λ1 and biased λ2 wherein both biased λ1 and biased λ2 have the same bias;

receiving biased λ1 at a first one PD1 of a pair of photodiodes operatively connected to the demultiplexer and receiving biased λ2 at a corresponding second one PD2 of the pair of photodiodes, each of PD1 and PD2 outputting a corresponding photocurrent $I_{PD1}$ and $I_{PD2}$ based on its respective input λ1 and λ2; and differencing the photocurrents $I_{PD1}$ and $I_{PD2}$ to produce the output RF signal;

wherein the even-order harmonics are cancelled in the output RF signal.

2. The method according to claim 1, wherein λ1 and λ2 are separated by 10 nm.

3. The method according to claim 1, wherein λ1 and λ2 comprise continuous wave laser beams.

4. The method according to claim 1, wherein both biased λ1 and biased λ2 are low-biased, the method further comprising passing the low-biased λ1 and low-biased λ2 to an amplifier intermediate the multiplexer and the photodiodes, wherein the final RF output has improved RF gain as a result of the presence of low-biased λ1 and low-biased λ2.

5. A method for producing an output RF signal free from second-order harmonic distortion in an analog optical fiber link, comprising:
receiving, at a dual-output Mach-Zehnder modulator, a first analog optical signal having a first wavelength λ1 and a second analog optical signal having a second wavelength λ2;
applying, at the Mach-Zehnder modulator, an input RF signal and a bias voltage to the first and second analog optical signals, wherein λ1 is high-biased and λ2 is simultaneously low-biased at a first output arm of the Mach-Zehnder modulator, and λ1 is low-biased and λ2 is simultaneously high-biased at a second output arm of the Mach-Zehnder modulator, a DC phase difference of λ1 $\phi_{dc,\lambda_1}$ and a DC phase difference of λ2 $\phi_{dc,\lambda_2}$ having the relation $$\phi_{dc,\lambda_2} = -\pi - \phi_{dc,\lambda_1};$$

receiving, at a multiplexer operatively connected to the Mach-Zehnder modulator, the output from the first and second output arms of the Mach-Zehnder modulator;
filtering, at the multiplexer, the output from the first and second output arms and outputting, from the multiplexer, a multiplexed signal consisting of biased λ1 and biased λ2 wherein both biased λ1 and biased λ2 have the same bias;
demultiplexing, at a demultiplexer operatively connected to the multiplexer, the multiplexed signal to separate the multiplexed signal into separate signals comprising biased λ1 and biased λ2;
receiving biased λ1 at a first one PD1 of a pair of photodiodes operatively connected to the demultiplexer and receiving biased λ2 at a corresponding second one PD2 of the pair of photodiodes, each of PD1 and PD2 outputting a corresponding photocurrent $I_{PD1}$ and $I_{PD2}$ based on its respective input λ1 and λ2, $I_{PD1}$ and $I_{PD2}$ being expressed by the equations $$I_{PD1}(\varphi_{dc,\lambda_1}, t) = \frac{1}{2}G_o\zeta(1 - \cos(\varphi_{dc,\lambda_1})J_0(\varphi_{rf})) +$$

$$G_o\zeta\sin(\varphi_{dc,\lambda_1})\sum_{n=0}^{\infty}J_{2n+1}(\varphi_{rf})\sin((2n+1)\Omega t) -$$

$$G_o\zeta\cos(\varphi_{dc,\lambda_1})\sum_{n=1}^{\infty}J_{2n}(\varphi_{rf})\cos(2n\Omega t)$$

$$I_{PD2}(\varphi_{dc,\lambda_2}, t) = \frac{1}{2}G_o\zeta(1 + \cos(\varphi_{dc,\lambda_2})J_0(\varphi_{rf})) -$$

$$G_o\zeta\sin(\varphi_{dc,\lambda_2})\sum_{n=0}^{\infty}J_{2n+1}(\varphi_{rf})\sin((2n+1)\Omega t) +$$

$$G_o\zeta\cos(\varphi_{dc,\lambda_2})\sum_{n=1}^{\infty}J_{2n}(\varphi_{rf})\cos(2n\Omega t),$$

where the line 1 of $I_{PD1}$, $I_{PD2}$ is the expression for the DC photocurrent, line 2 represents the components due to the odd-order harmonics, which include the fundamental, and line 3 represents the components due to the even-order harmonics; and
differencing $I_{PD1}$ and $I_{PD2}$ to produce the output RF signal $RF_{out}$ $$RF_{OUT} = I_{PD1} - I_{PD2}$$
$$= 2G_o\zeta\sin(\varphi_{dc,\lambda_1})\sum_{n=0}^{\infty}J_{2n+1}(\varphi_{rf})\sin((2n+1)\Omega t);$$

wherein the even-order harmonics are cancelled from $RF_{out}$.

6. The method according to claim 5, wherein λ1 and λ2 are separated by 10 nm.

7. The method according to claim 5, wherein λ1 and λ2 comprise continuous wave laser beams.

8. The method according to claim 5, wherein both biased λ1 and biased λ2 are low-biased, the method further comprising passing the low-biased λ1 and low-biased λ2 to an amplifier intermediate the multiplexer and the photodiodes, wherein $RF_{out}$ has improved RF gain as a result of the presence of low-biased λ1 and low-biased λ2.

9. The according to claim 8, wherein the RF output power of $RF_{out}$ is expressed by the relation $$P_{rf,fund,two\ wavelength}(\varphi_{dc}) = \frac{1}{2}I_{fund}^2 Z_{out}$$
$$\frac{1}{2}[(G_{o,two\ wavelength}\zeta)^2\sin^2(\varphi_{dc,\lambda_1})J_1^2(\varphi_{rf})]$$
$$Z_{out},$$

where $$G_{o,two\ wavelength} = \frac{G_{o,ss}}{1 + \frac{G_{o,ss}P_{mzm}}{P_{o,max}}},$$

$G_{o,ss}$ is the small-signal optical gain of the amplifier, $P_{mzm}$ is the output power of the MZM, $P_{o,max}$ is the maximum optical output power of the amplifier, and $Z_{out}$ is the output impedance of the amplifier.

10. A method for producing an output RF signal free from second-order harmonic distortion and having improved RF gain in an analog optical fiber link, comprising:
receiving, at a dual-output Mach-Zehnder modulator, a first analog optical signal having a first wavelength λ1 and a second analog optical signal having a second wavelength λ2;
applying, at the Mach-Zehnder modulator, an input RF signal and a bias voltage to the first and second analog optical signals, wherein λ1 is high-biased and λ2 is simultaneously low-biased at a first output arm of the Mach-Zehnder modulator, and λ1 is low-biased and λ2 is simultaneously high-biased at a second output arm of the Mach-Zehnder modulator;
receiving, at a multiplexer operatively connected to the Mach-Zehnder modulator, the output from the first and second output arms of the Mach-Zehnder modulator;

filtering, at the multiplexer, the output from the first and second output arms and outputting, from the multiplexer, a multiplexed signal consisting of low-biased $\lambda 1$ and low-biased $\lambda 2$;

receiving the amplified low-biased $\lambda 1$ at a first one PD1 of a pair of photodiodes operatively connected to the demultiplexer and receiving the amplified low-biased $\lambda 2$ at a corresponding second one PD2 of the pair of photodiodes, each of $\lambda 1$ and $\lambda 2$ passing through an amplifier before being passed to the photodiode, each of PD1 and PD2 outputting a corresponding photocurrent $I_{PD1}$ and $I_{PD2}$ based on its respective input $\lambda 1$ and $\lambda 2$; and differencing the photocurrents $I_{PD1}$ and $I_{PD2}$ to produce the output RF signal;

wherein the even-order harmonics are eliminated from the output RF signal; and further wherein the optical gain from each of low-biased $\lambda 1$ and low-biased $\lambda 2$ add in the output RF signal.

11. The method according to claim 10, wherein $\lambda 1$ and $\lambda 2$ are separated by 10 nm.

12. The method according to claim 10, wherein $\lambda 1$ and $\lambda 2$ comprise continuous wave laser beams.

* * * * *